Patented Apr. 16, 1940

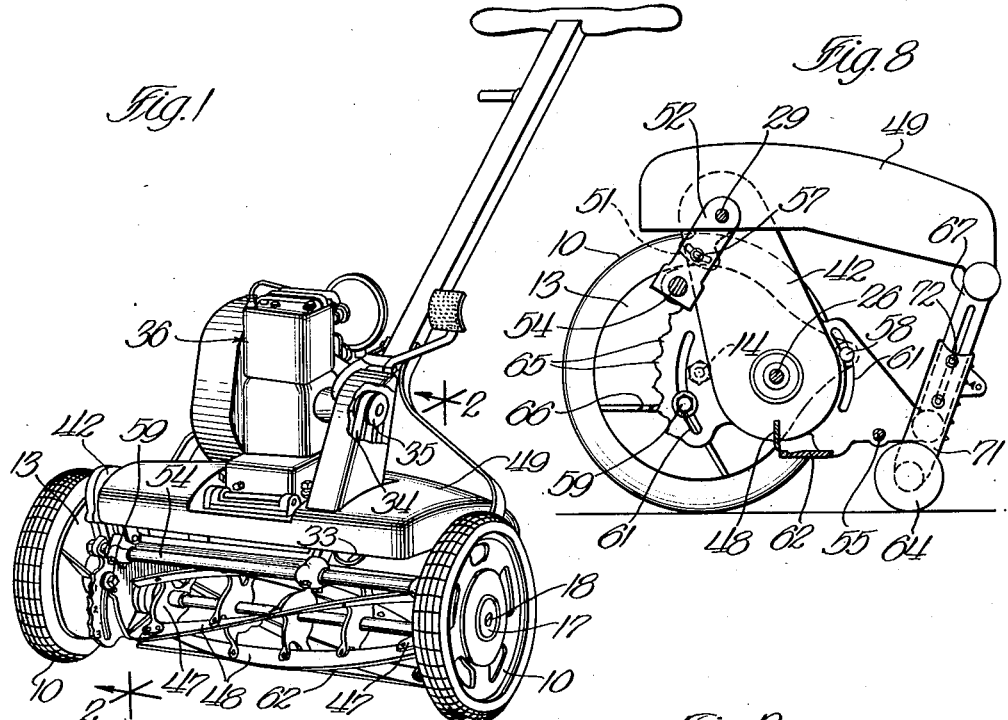

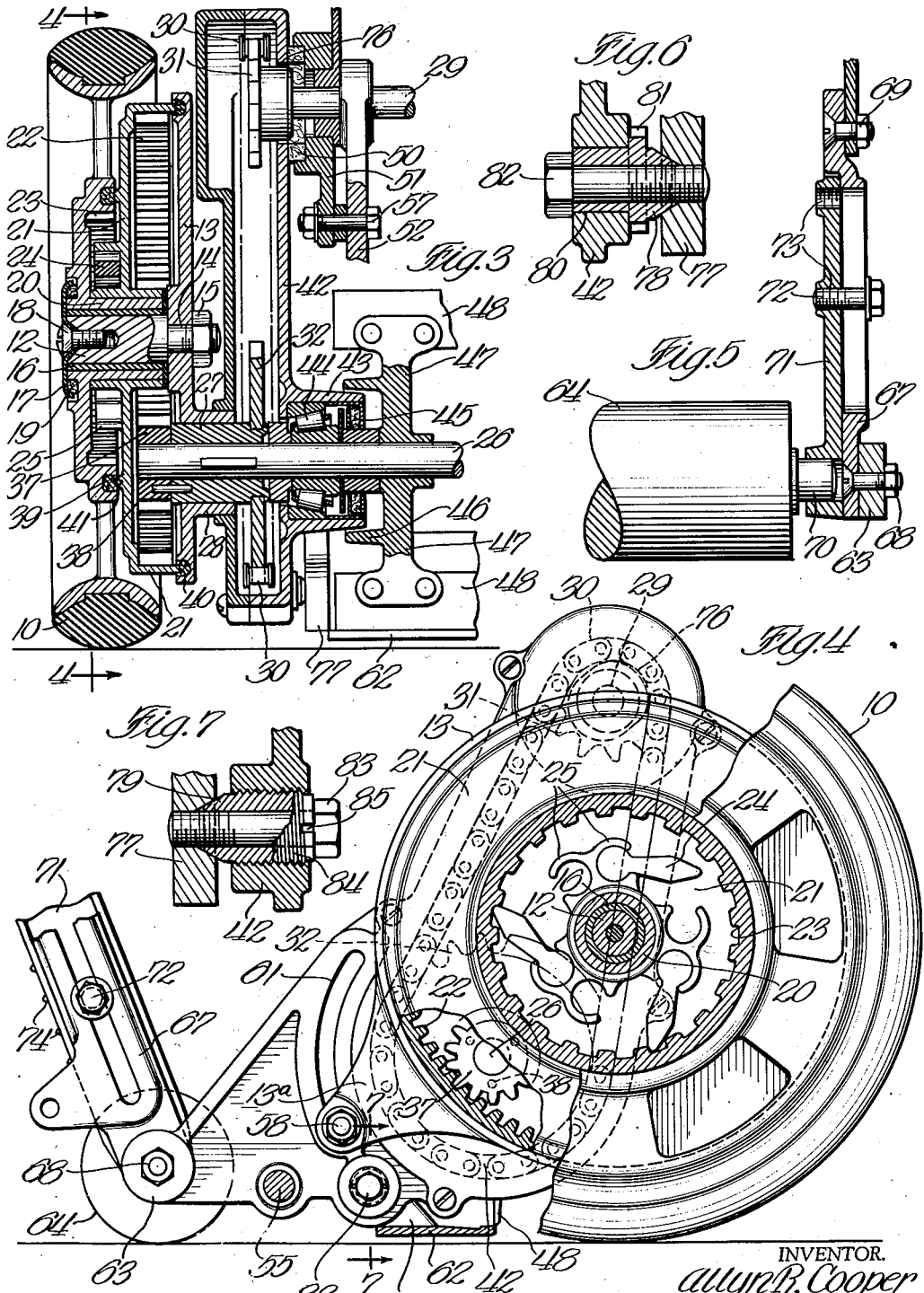

2,197,264

UNITED STATES PATENT OFFICE 2,197,264

LAWN MOWER STRUCTURE

Allyn R. Cooper, Marshalltown, Iowa, assignor to Cooper Manufacturing Company, Marshalltown, Iowa, a corporation of Iowa Application April 18, 1938, Serial No. 202,705

10 Claims. (Cl. 56—26)

An object of my present invention is to provide a lawn mower structure of simple, durable and inexpensive construction.

A further object of my invention is to provide a lawn mower structure in which the parts are so arranged that they can be readily adjusted for cutting different heights of grass, the adjustment being such that the bed plate is retained in a level position instead of rocking up behind the reel and thereby in my device the grass is efficiently cut whether the mower is adjusted for a low or a high cut.

Still a further object is to provide a mower so constructed that it is particularly adaptable for power operation, the parts being so designed and arranged that long life thereof is secured, yet the parts may be inexpensively manufactured.

Further objects are to provide means for sealing in power transmitting means, a ratchet mechanism and a chain drive of the mower and to also seal in roller bearings for the reel shaft so that dust and dirt is excluded from the parts, thus making them wear much longer than the usual type of construction.

Still another object is to provide means for adjusting the bed plate to compensate for uneven wear of the mower reel or uneven grinding thereof, the parts being readily operated to secure the desired result and being effectively locked in position after adjustment of the bed plate has been secured.

With these and other objects in view, my invention consists in the construction, arrangement and combination of the various parts of my mower structure whereby the objects contemplated are attained, as hereinafter more fully set forth, pointed out in my claims, and illustrated in the accompanying drawings, in which:

Figure 1 is a perspective view of a mower structure embodying my invention.

Figure 2 is an enlarged sectional view on the line 2—2 thereof with the deck of the structure on which the power means is mounted being shown in end view.

Figure 3 is an enlarged sectional view on the line 3—3 of Figure 2 illustrating various power transmission connections and casings for the connections together with sealing means to prevent entrance of dust and dirt into the casings.

Figure 4 is a partial sectional view on the line 4—4 of Figure 3 showing operative connections between a power shaft and the traction wheels of the mower structure.

Figure 5 is an enlarged sectional view on the line 5—5 of Figure 2 showing connections between one of the side frames of the mower structure and the roller at the rear of the mower.

Figure 6 is a sectional view on the line 6—6 of Figure 2 showing the connection between one end of the bed plate and one of the side frames of the mower structure.

Figure 7 is an enlarged sectional view showing the connection between the other end of the bed plate and the other side frame; and Figure 8 is a semi-diagrammatic view similar to Figure 2 showing the mower adjusted for a higher cut of grass.

On the accompanying drawings I have used the reference numeral 10 to indicate a traction wheel, two of the wheels being provided as shown in Figure 1. Each of the wheels is supported on a stud 12 as shown in Figure 3. The studs 12 are supported by plates 13. For this purpose the studs 12 are provided with shouldered shanks 14 and nuts 15 are threaded thereon as shown in Figure 3. In this figure only one of the traction wheels and its associated parts are shown but it is to be understood that the opposite end of the mower is similarly constructed.

Each stud 12 is enclosed in a sleeve-like bearing 16 preferably of graphite bronze or other material to form an "oilless" bearing. The wheel 10 is retained on the stud 12 by a washer 17 and a screw 18. The washer 17 has a flanged periphery surrounding a felt sealing washer 19 to prevent entrance of dirt into the bearing sleeve 16. The wheel 10 has a sleeve 20. Rotatably mounted on the sleeve 20 is a gear casing 21 having internal gear teeth 22.

The gear casing 21 is operatively connected to the wheel 10 by a ratchet connection shown in Figure 4. This connection consists of internal ratchet teeth 23 formed in the wheel 10 with which pivoted pawls 24 are adapted to coact. The gear casing 21 is provided with semi-circular sockets 25 to receive cylindrical heads of the pawls 24 and these sockets are made in opposed pairs so that the pawls can be assembled as shown in Figure 4 for the left-hand wheel while for the right-hand wheel the pawls would be reversed.

A reel shaft 26 is provided extending through the plate 13 and into the gear casing 21. On each end of the shaft 26 I key a hub 27 which is rotatable in a hub 28 of the plate 13. The hubs 27 are driven from a power shaft 29 by a chain 30 meshing with a drive sprocket pinion 31 and a driven sprocket gear 32.

The gear 32 is secured to the hub 27 while the pinion 31 is secured to the power shaft 29. The shaft 29 in turn has thereon a pulley 33 (see Figure 1) driven by a belt 34 from a drive pulley 35. The pulley 35 is mounted on the shaft of an internal combustion engine 36 shown by way of illustration as power means for the mower.

The hub 27 drives the reel shaft 26 and also the traction wheel 10. For driving the traction wheel 10 a pinion 37 is mounted on each end of the shaft 26 to mesh with the internal gear teeth 22 of the two traction wheels. An operative connection is provided between the hub 27 and the pinion 37 in the form of drive pins 38 extending into the hub and into the pinion. This permits ready dismounting of the pinion for removal or repair, yet, when the parts are assembled, the pins are retained against dislocation.

Heretofore it has been customary to provide the pinion 37 of cast iron coacting with cast iron internal gear teeth 22. With my construction I form the pinion 37 of steel so that the teeth thereof can be accurately cut for efficient operation and when coacting with the cast teeth 22 they soon wear them to a desirable shape for efficient operation since the steel of course is harder than the cast iron. I thereby provide a structure which will last much longer and operate quieter than the usual type of mower. In order to further enhance the life thereof I provide sealing means consisting of felt washers 39 and 40 carried by the wheel 10 and the periphery of the plate 13 and coacting with an annular bead 41 and the rim of the gear casing 21 respectively as shown in Figure 3. This keeps all dust and dirt out of the gearing and ratchet mechanism.

For the chain 30 and the sprockets 31 and 32 I provide a chain housing 42. The chain housing 42 is rotatable on the hub 28 for adjusting the height of the bed plate as will hereinafter appear. The chain housing 42 and a companion member (not shown) which does not have provision to enclose a chain are provided with hubs 43 receiving roller bearings 44 for the reel shaft 26. The roller bearings 44 are sealed against entrance of dirt by enclosed felt washers 45 and grass is prevented from clogging the washers 45 by hubs 46 surrounding the hubs 43. The hubs 46 are formed on the end spiders 47 of the mower reel, the blades of which are indicated at 48.

The motor 36 is supported on a deck 49 which has the power shaft 29 journaled relative thereto. The deck extends to the chain housing 42 and a felt or cork washer 50 is provided between it and the chain housing to prevent entrance of dirt to the chain housing at this point. The deck 49 is not supported directly by the chain housing but by arm members 51 and 52. The arm members 52 are clamped by bolts 53 to a cross rod 54 extending rigidly between the chain housing 42 and its companion member of the mower which may be considered side frames thereof. These side frames are also connected adjacent their lower ends by a cross rod 55. The arm members 51 are secured as by bolts 56 to the ends of the deck 49 and are swingable relative to the arm members 52, the arm members being normally connected together by arcuate slots receiving clamp bolts 57.

The plates 13 are provided with extensions 13a (see Figures 2 and 4) which support clamp bolts 58. Spaced ahead of the studs 12 are clamp bolts 59 threaded into the plates 21. The clamp bolts 58 and 59 extend through arcuate slots 61 of the side frames 42. A bed plate 62 is carried by the side frames 42 and the frames have rearward extensions 63 carrying a roller 64. From the foregoing description it is obvious that the bolts 58 and 59 can be loosened so that the side frames 42 can be rotated relative to the plates 13. In Figure 2 they are shown relatively rotated so as to secure a low cut of grass between the bed plate 62 and the reel blades 48. Pointers 65 are provided on the side frames 42 cooperating with a rib 66 of the plate 13 to indicate the depth of cut as one-half inch, one inch, etc. As shown in Figure 8 the mower is adjusted for a 2½ inch depth of cut.

If the roller 64 were permitted to remain as in Figure 2, it is obvious that the bed plate 62 would tilt forwardly and downwardly. In order to retain it in level position, the roller 64 is adjustably mounted relative to the mower in the following manner. Slotted links 67 are joined as at 68 to the side frame extension 63. Their upper ends are connected as by bolts 69 to the deck 49. Thus the deck, the side frames and the links 67 are all rigidly connected together.

The roller 64 is provided with a roller shaft 70 which is rotatably mounted in the lower ends of a pair of links 71. The links 71 are slidable longitudinally of the slotted links 67 and may be clamped relative thereto by clamping bolts 72 extending through the slots of the links 67 and into the links 71. The links 71 are provided with a pair of spaced threaded openings 73 to receive the bolt 72 in different positions of adjustment.

The links 67 and 71 are provided with coacting pointers 74 and 75 so that they can be adjusted to correspond to the rotary adjustment of the side frames 42 relative to the plates 41. This is readily apparent from a comparison of Figure 2 with Figure 8. After the adjustment is made, then the clamping bolts 58 and 59 can be tightened to retain the adjustment. During the change in adjustment there is some slight rocking motion between the deck arms 51 and 52. This is taken care of by loosening the bolt 57 prior to the change in adjustment and tightening it thereafter.

The clamp bolts 53 can be loosened when it is desirable to tighten the chain 30 by swinging the power shaft 29 about the cross rod 54 which moves the power shaft either closer to or farther from the pointer shaft 26. Provision is made for such movement by providing the opening 76 in the chain casing and side frame 42 slightly arcuate about the cross rod 54 as a center as shown in Figure 4. Full details relative to this adjustment will be found in my co-pending application, Serial No. 142,646, filed May 14, 1937.

Mower reels have a tendency to wear unevenly at opposite ends. Also there is a possibility of grinding the reel on a slight taper. I make provision for adjusting the bed plate 62 to compensate for such discrepancies by providing the following described mounting for the bed plate. The bed plate at its opposite ends has a pair of arms 77 which are pivoted on pintle elements 78 and 79. The pintle element 78 has an eccentric portion 80 rotatably mounted in the periphery of the pintle member so that a spanner wrench can be used for rotating the pintle member, thus shifting this end of the bed plate toward or away from the reel while the other end mounted on the pintle member 79 remains stationary. Thus the bed plate can be tipped slightly from a level position to take care of tapered reels. After the adjustment is made, the parts are retained in their newly adjusted position by a clamp bolt 82 extending through the pintle member 78 and threaded into the end member 77 of the bed plate 62.

At the opposite end of the bed plate the end member 77 likewise has a clamp bolt 83 threaded into it while the pintle member 79 instead of having an eccentric portion is threaded as indicated at 84 into its side frame 42. The pintle element 79 is slotted as at 85 to permit rotation thereof for adjusting the pintle member 79 toward or away from the other pintle member 78. In this way play between the pintle elements and the bed plate can be taken up.

The cutting edge of the bed plate can be adjusted toward or away from the mower reel in the usual manner by set screws 86 and 87 carried by the end members 77 of the bed plate and lugs 88 of the side frames 42 and coacting with lugs 89 of the side frames and with the arms 77 respectively in the usual manner as shown in Figure 2.

By the peculiar mounting of the side frames relative to the plates 13 in conjunction with the possibility of adjusting the roller relative to the side frames, I am able to secure different heights of cut and at each position have the reel blades strike the grass squarely with the bed plate mounted directly under the reel shaft. Thus it is immaterial from the standpoint of efficiency of cutting whether the mower is adjusted for deep or shallow cutting. By the construction and arrangement of parts as shown in Figure 3, I am able to enclose the operating mechanism and seal it against the entrance of dirt so that the parts will operate efficiently and last much longer than the usual construction of lawn mower. This is particularly desirable where the mower is power driven and expected to perform heavy duty operation. The bed plate may be accurately adjusted relative to the mower reel in a manner heretofore impossible particularly with respect to mower reels which are inadvertently sharpened on a taper or which become worn more on one end than on the other.

Some changes may be made in the construction and arrangement of the parts of my mower structure without departing from the real spirit and purpose of my invention. It is therefore my intention to cover by my claims any modified forms of structure or use of mechanical equivalents which may be reasonably included within their scope.

I claim as my invention:

1. In a mower structure, a pair of traction wheels, wheel plates on which said wheels are journaled, spaced side frames pivoted on said wheel plates at points spaced from the journal axes of said traction wheels to the plates, a reel journaled relative to said side frames and said wheel plates on an axis at the pivotal connection of said side frames to said plates, a bed plate for coaction with the blades of said reel, said bed plate being carried by said side frames and a roller carried by said side frames, pivotal movement of said side frames about the pivotal connections thereof to said wheel plates changing the elevation of the bed plate from the ground surface while said bed plate remains in a parallel position relative to the ground surface, said roller being adjustable to a position contacting with the ground when said bed plate is parallel thereto.

2. In a mower structure, a pair of traction wheels, wheel plates on which said wheels are journaled, spaced side frames pivoted to said wheel plates at points spaced from the journal axis of said traction wheels to the wheel plates, a reel journaled relative to said side frames, a bed plate for coaction with the blades of said reel, said bed plate being carried by said side frames and a roller carried by said side frame and adjustable relative thereto, pivoting of said side frames about the pivotal connections thereof to said wheel plates and adjustment of said roller effecting a change in the elevation of said bed plate from the ground surface.

3. In a mower structure, a pair of wheel plates, wheels journaled thereon, spaced side frames adjustably pivoted to said wheel plates at points spaced from the journal axis of said wheels to the plates, a reel journaled relative to said wheel plates on an axis at the pivotal connection to said side frames thereto, a bed plate for coaction with the blades of said reel, said bed plate being carried by said side frames and a roller carried by said side frames and adjustable in height relative thereto.

4. In a power lawn mower, a pair of traction wheels, wheel plates on which said traction wheels are journalled, side frames pivoted to said plates at points spaced from the journal axes of said traction wheels thereto, a reel journaled relative to said side frame on an axis coincident with the pivotal connection of the side frames to the wheel plates, a bed plate for coaction with said reel, said bed plate being carried by said side frames, a deck mounted on said side frames, a motor mounted on said deck and operatively connected with said reel and a roller carried by said side frame said roller being adjustable relative to said side frames and connected with said deck to permit retention of said deck in a substantially level position.

5. In a power lawn mower, a pair of traction wheels, wheel plates on which said traction wheels are journalled, side frames pivoted to said plates at points spaced from the journal axes of said traction wheels thereto, a reel journaled relative to said side frame, a substantially level bed plate on said side frames for coaction with said reel, a substantially level deck mounted on said side frames, a motor mounted on said deck and operatively connected with said reel and a roller carried by said side frames and adjustable relative thereto, pivotal movement of said side frames about the pivotal connections thereof to said wheel plates and adjustment of said roller relative to said side frames changing the elevation of the bed plate from the ground surface, and permitting retention of said bed plate and said deck in substantially level positions.

6. In a power lawn mower, a pair of wheel plates, traction wheels journalled thereon, side frames pivoted to said plates at points spaced from the axis of said traction wheels, a reel journalled on said side frames, a bed plate for coaction with said reel, a deck mounted on said side frames, a motor mounted on said deck and operatively connected with said reel and a roller carried by said side frame and adjustable in height relative thereto.

7. In a mower structure, a traction wheel, a gear casing rotatable relative thereto and having ratchet connection therewith, a reel shaft, a hub thereon journalled in said gear casing, a pinion on said reel shaft adjacent the end of said hub, internal gear teeth in said gear casing and meshing with said pinion, drive pins extending into one end of said hub and into said pinion to effect a driving connection between the two and power means supported by said gear casing and operatively connected with said hub.

8. In a mower structure, a gear casing, a traction wheel rotatable relative thereto and having ratchet connection therewith, a reel shaft, a hub thereon journalled in said gear casing, a pinion on said reel shaft adjacent the end of said hub, internal gear teeth in said gear casing and meshing with said pinion, drive pins extending into one end of said hub and into said pinion to effect a driving connection between the two, a sprocket gear on said hub, a chain casing surrounding said sprocket gear, a power shaft extending into said chain casing, a sprocket pinion thereon and a chain in said chain casing operatively connecting said sprocket gear to said sprocket pinion.

9. In a lawn mower, a traction wheel, a wheel plate, a stud extending therefrom, said traction wheel being journalled thereon, a washer for retaining said wheel thereon, a seal between the periphery of said washer and said wheel, an internal gear rotatable on said stud between said traction wheel and wheel plate and having ratchet connection with said wheel, a seal between said traction wheel and said internal gear and a seal between said internal gear and said wheel plate.

10. In a lawn mower, a plate, a stud extending therefrom, a traction wheel journalled thereon, an internal gear rotatable on said stud between said wheel and wheel plate and having ratchet connection with said wheel, a seal between said traction wheel and internal gear and a seal between said internal gear and said wheel plate.

ALLYN R. COOPER.